United States Patent
Klimmasch et al.

(10) Patent No.: US 11,664,491 B2
(45) Date of Patent: May 30, 2023

(54) ANODE FOR AN ELECTROCHEMICAL CELL

(71) Applicants: OXIS ENERGY LIMITED, Abingdon (GB); COVESTRO DEUTSCHLAND AG, Leverkusen (DE)

(72) Inventors: Thomas Klimmasch, Leverkusen (DE); Jan Weikard, Leverkusen (DE); Hans-Josef Laas, Odenthal (DE); Jürgen Köcher, Langenfeld (DE); David Ainsworth, Abingdon (GB); Stephen Rowlands, Abingdon (GB); Justyna Katarzyna Kreis, Abingdon (GB); Stephen Lawes, Abingdon (GB); Sebastien Desilani, Abingdon (GB)

(73) Assignee: JOHNSON MATTHEY PLC, London (GB)

( * ) Notice: Subject to any disclaimer, the term of this patent is extended or adjusted under 35 U.S.C. 154(b) by 366 days.

(21) Appl. No.: 16/330,730

(22) PCT Filed: Sep. 5, 2017

(86) PCT No.: PCT/EP2017/072236
§ 371 (c)(1),
(2) Date: Mar. 5, 2019

(87) PCT Pub. No.: WO2018/046494
PCT Pub. Date: Mar. 15, 2018

(65) Prior Publication Data
US 2019/0229326 A1  Jul. 25, 2019

(30) Foreign Application Priority Data
Sep. 6, 2016 (EP) .................................. 16187487

(51) Int. Cl.
*H01M 4/137* (2010.01)
*H01M 4/134* (2010.01)
(Continued)

(52) U.S. Cl.
CPC ........... *H01M 4/137* (2013.01); *H01M 4/134* (2013.01); *H01M 4/1395* (2013.01); *H01M 4/38* (2013.01);
(Continued)

(58) Field of Classification Search
CPC .... H01M 4/137; H01M 4/134; H01M 4/1395; H01M 4/38; H01M 4/382; H01M 4/622;
(Continued)

(56) References Cited

U.S. PATENT DOCUMENTS 4,487,928 A    12/1984  Richter et al.
5,252,696 A *  10/1993  Laas ............... C08G 18/706
                                                    528/49

(Continued)

FOREIGN PATENT DOCUMENTS

CN    100341196 C    10/2007
CN    105706274 A     6/2016
(Continued)

OTHER PUBLICATIONS

Croce et al., "Nanocomposite Polymer Electrolytes for Lithium Batteries", Nature Publishing Group, United Kingdom, vol. 394, Jul. 30, 1998, pp. 456-458.
(Continued)

*Primary Examiner* — Haixia Zhang
(74) *Attorney, Agent, or Firm* — BakerHostetler

(57) ABSTRACT

An anode for an electrochemical cell comprises a lithium metal or lithium metal alloy, and a polymer coating deposited on the lithium metal or lithium metal alloy. The polymer coating is doped with lithium ions and comprises a polyi-
(Continued)

socyanurate material. The polyisocyanurate material contains ether- and/or silicone-containing further groups. The ether-containing group is a polyether, and/or wherein the silicone-containing group is a siloxane group.

17 Claims, 1 Drawing Sheet

(51) Int. Cl.
*H01M 10/052* (2010.01)
*H01M 4/62* (2006.01)
*H01M 4/1395* (2010.01)
*H01M 4/38* (2006.01)
*H01M 10/0525* (2010.01)
*H01M 4/40* (2006.01)
*H01M 4/02* (2006.01)

(52) U.S. Cl.
CPC .......... *H01M 4/382* (2013.01); *H01M 4/622* (2013.01); *H01M 10/052* (2013.01); *H01M 10/0525* (2013.01); *H01M 4/405* (2013.01); *H01M 4/62* (2013.01); *H01M 2004/027* (2013.01)

(58) Field of Classification Search
CPC ...... H01M 4/408; H01M 4/62; H01M 10/052; H01M 10/0525; H01M 2004/027; C08G 18/48
USPC ........................................ 429/212
See application file for complete search history.

(56) References Cited

U.S. PATENT DOCUMENTS

| | | | |
|---|---|---|---|
| 9,994,959 B2 | 6/2018 | Laramie et al. | |
| 2004/0043298 A1 | 3/2004 | Lee | |
| 2005/0042515 A1 | 2/2005 | Hwang | |
| 2006/0079660 A1* | 4/2006 | Ludewig | C09D 175/14 528/44 |
| 2006/0155095 A1 | 7/2006 | Daussin et al. | |
| 2009/0018302 A1* | 1/2009 | Laas | C08G 18/289 528/17 |
| 2010/0292396 A1* | 11/2010 | Binder | C08G 18/02 524/590 |
| 2011/0082273 A1* | 4/2011 | Laas | C08G 18/809 528/38 |
| 2013/0072587 A1* | 3/2013 | Cremer | C08G 77/16 521/154 |
| 2013/0149453 A1* | 6/2013 | Romick | C09D 167/00 427/385.5 |
| 2014/0272595 A1 | 9/2014 | Cristadoro et al. | |
| 2015/0010804 A1 | 1/2015 | Laramie et al. | |
| 2015/0149453 A1* | 5/2015 | Blue | G06F 16/951 707/727 |
| 2015/0179453 A1* | 6/2015 | Cheng | H01L 21/76243 438/517 |
| 2016/0118638 A1* | 4/2016 | Gronwald | H01M 4/62 429/126 |
| 2016/0211583 A1* | 7/2016 | Lee | H01Q 9/0407 |
| 2018/0118911 A1* | 5/2018 | Joncheray | C08J 9/28 |

FOREIGN PATENT DOCUMENTS

| | | |
|---|---|---|
| JP | 2005071998 A | 3/2005 |
| JP | 2016069388 A | 5/2016 |
| KR | 2005-0023123 A | 3/2005 |
| KR | 2005-0104402 A | 11/2005 |
| KR | 2016-0025032 A | 3/2016 |
| TW | 201615770 A | 5/2016 |
| WO | WO 2004/078820 A1 | 9/2004 |

OTHER PUBLICATIONS

Communication pursuant to Article 94(3) EPC of the European Application No. 17 758 906.6 dated Apr. 9, 2020; 4 pages.
Fedelich, "Application Handbook Thermal Analysis of Polymers Selected Applications Thermal Analysis", Jan. 1, 2013, XP055608279. Retrieved from the Internet: URL:https://www.mt.com/dam/LabDiv/guides-glen/ta-polymer/TA_Polymers_Selected_Apps_EN.pdf [retrieved on Jul. 24, 2019].
Taiwanese Office Action of Application No. 106130488 dated Mar. 11, 2021, 4 pages.

* cited by examiner

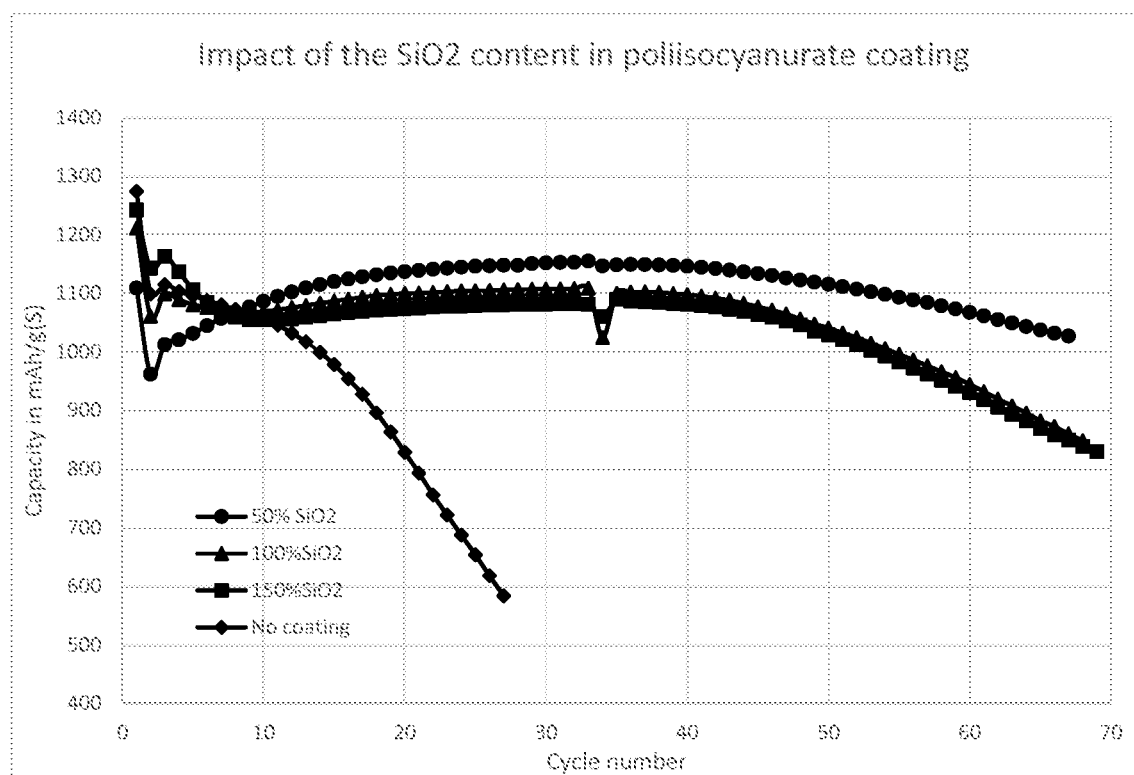

ANODE FOR AN ELECTROCHEMICAL CELL

CROSS-REFERENCE TO RELATED APPLICATIONS

This application is a National Stage of International Patent Application No. PCT/EP2017/072236, filed Sep. 5, 2017 and published as WO 2018/046494 A1, entitled "ANODE FOR AN ELECTROCHEMICAL CELL," which claims priority from EP Application No. 16187487.0, filed Sep. 6, 2016, both of which are incorporated herein by reference in their entirety for all purposes. All patents and patent applications cited in this application, all related applications referenced herein, and all references cited therein are incorporated herein by reference in their entirety as if restated here in full and as if each individual patent and patent application was specifically and individually indicated to be incorporated by reference.

The present invention relates to an anode for an electrochemical cell and a lithium sulphur cell comprising such an anode. The present invention also relates to a method of forming a coating on an anode of an electrochemical cell.

BACKGROUND

A typical lithium-sulphur cell comprises an anode (negative electrode) formed from lithium metal, and a cathode (positive electrode) formed from a mixture of elemental sulphur or other electroactive sulphur material and an electrically conductive material, such as carbon black. The electrodes are placed in contact with an electrolyte that is typically formed of a lithium salt dissolved in an electrolyte solvent.

Lithium-sulphur cells are secondary cells. When a lithium-sulphur cell is discharged, the sulphur (e.g. elemental sulphur) is reduced, for example, to form soluble polysulphide species, $S_n^{2-}$ ($n \geq 2$). When the cell is charged, the reactions occur in reverse, with the sulphide or polysulphides being oxidised back to sulphur.

Lithium metal is a strong reducing agent. Accordingly, when the lithium metal anode comes into contact with the electrolyte solvent, the electrolyte solvent tends to react with the lithium metal to form a solid electrolyte interface (SEI). The SEI generally has a high ionic conductivity, allowing lithium ions to flow from the anode's surface into the electrolyte and vice-versa. The SEI also prevents further contact between the lithium metal and the electrolyte solvent. Thus, the SEI can protect the lithium anode at least to some degree by preventing the lithium anode from being consumed by further reactions with the electrolyte. However, the SEI may not prevent polysulphides that are dissolved in the electrolyte from reacting with the lithium metal to form lithium sulphide ($Li_2S$) or high order polysulphides (e.g. $Li_2S_2$) on the lithium metal's surface. These reaction products may become incorporated in the SEI, reducing the amount of electroactive sulphur material available for the cell's charge and discharge reactions. Furthermore, during cycling, the SEI can break down, exposing the electrolyte to fresh lithium. This can lead to further reaction between the lithium anode and the electrolyte, causing the electrolyte to be depleted over time. Eventually, the cell can dry out, leading to cell failure.

BRIEF DESCRIPTION OF DRAWINGS

FIG. 1 shows how the capacity of the cells of Example 1 vary with increasing cycle number.

DESCRIPTION

Before particular examples of the present invention are described, it is to be understood that the present disclosure is not limited to the particular cell, method or material disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an", and "the" include plural forms unless the context clearly dictates otherwise. Thus, for example, reference to "an anode" includes reference to one or more of such elements.

According to the present invention, there is provided an anode for an electrochemical cell, said anode comprising:

a lithium metal or lithium metal alloy, and a polymer coating deposited on the lithium metal or lithium metal alloy, wherein the polymer coating is doped with lithium ions and comprises a polyisocyanurate material.

The present invention also relates to a lithium-sulphur cell comprising an anode as described herein, a cathode comprising an electroconductive material and an electroactive material comprising sulphur, and an electrolyte.

According to a further aspect, there is provided a method of forming a coating on an anode of an electrochemical cell. The method comprises contacting an anode formed of lithium metal or lithium metal alloy with a coating composition. The coating composition is in the form of a dispersion or a solution and contains a polymer precursor, a lithium metal salt and a solvent. According to the present invention, the polymer precursor may be a monomeric isocyanate, an oligomeric polyisocyanate or a mixture comprising both monomeric and polymeric isocyanates.

The polyisocyanurate may be a polyisocyanurate plastics material. A "polyisocyanurate plastics material", as used herein, is a plastics material containing polyisocyanurate. In a preferred embodiment of the present invention, the plastic material predominantly comprises polyisocyanurate. In the most preferred embodiment of the present invention, the plastics material consists of a polyisocyanurate. Blends of polyisocyanurates and other plastics materials are likewise incorporated by the term "polyisocyanurate plastics material", as used herein.

Where "plastics material" is mentioned in this document, this is taken to mean a product which is largely dimensionally stable at ambient temperature—in contrast to, for example, gels or liquids. The term "plastics material", as used herein, includes all conventional classes of plastics materials, i.e. in particular also thermosetting plastics, thermoplastics and elastomers.

A "polyisocyanurate", as used herein, is any molecule, preferably a polymer, having a plurality of isocyanurate structural units, for example at least 10 isocyanurate structural units. A molecule having a single isocyanurate structural unit can be called an "isocyanurate".

The characteristic, cyclical isocyanurate structural unit is reproduced in the following structural formula:

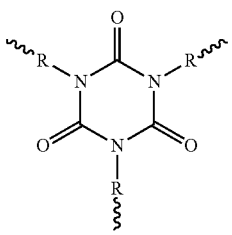

Isocyanurates and polyisocyanurates can be obtained by addition reactions employing at least two polyisocyanates or oligomeric polyisocyanates. It is preferred to use oligomeric polyisocyanates as precursors for the addition reaction because the formation of an isocyanurate group from two isocyanate groups is strongly exothermic. Hence, the use of oligomeric polyisocyanates as precursors of the polyisocyanurate decreases the amount of heat generated during the reaction because a proportion of the isocyanate groups has already been consumed in the oligomerization of the monomeric polyisocyanates. Since a high reaction temperature may have undesirable consequences such as the formation of bubbles or even the volatilization or decomposition of the isocyanates, the use of oligomeric polyisocyanates as precursors may be advantageous. Oligomeric polyisocyanates are preferably produced by cyclotrimerisation of monomeric polyisocyanates.

However, according to examples of the invention, polyisocyanurates are to be used as a coating material, i.e. for the formation of a layer which is thin typically in the range of 1 to 300 μm. During the formation of such a thin layer, the transfer of heat generated by the reaction to the surrounding medium may not be difficult. Accordingly, despite the generation of a significant amount of reaction heat, the temperature of the coating may not exceed a level that leads to the undesirable consequences described above. Therefore, in another preferred embodiment of the invention, the polyisocyanurate is formed by using a mixture comprising monomeric polyisocyanates as well as oligomeric polyisocyanates or even a composition which essentially consists of monomeric polyisocyanates. The term "essentially consists" refers to a proportion of monomeric polyisocyanates in the mixture of more than 90 weight-%, preferably more than 95 weight-%, even more preferably more than 98 weight-% and, most preferably, more than 99 weight-%.

The term "polyisocyanate", as used herein, is a collective term for compounds that contain two or more isocyanate groups in the molecule (a person skilled in the art takes this to mean free isocyanate groups of general structure —N=C=O). The simplest and most important representatives of these polyisocyanates are the diisocyanates. These have the general structure O=C=N—R—N=C=O, where R conventionally represents aliphatic, alicyclic and/or aromatic radicals.

A large number of polymers (e.g. polyurethanes, polyureas and polyisocyanurates) and low-molecular compounds (e.g. those with a uretdione, isocyanurate, allophanate, biuret, iminooxadiazindione and/or oxadiazintrione structure) may be prepared from polyisocyanates owing to their multi-functionality (≥2 isocyanate groups).

Where "polyisocyanates" are mentioned in general here, these are taken to mean monomeric and/or oligomeric polyisocyanates equally. For an understanding of many aspects of the invention it is important, however, to distinguish between monomeric and oligomeric polyisocyanates. Where "oligomeric polyisocyanates" are mentioned here, these are taken to mean polyisocyanates that are constructed from at least two monomeric diisocyanate molecules, i.e. they are compounds that constitute or contain a reaction product comprising at least two monomeric diisocyanate molecules.

The preparation of oligomeric polyisocyanates from monomeric diisocyanates is also called oligomerisation of monomeric diisocyanates here. This "oligomerisation", as used herein, denotes the reaction of monomeric diisocyanates to give oligomeric polyisocyanates with a uretdione, isocyanurate, allophanate, biuret, iminooxadiazindione and/ or oxadiazintrione structure.

Therefore, e.g. hexamethylene diisocyanate (HDI) is a "monomeric diisocyanate", since it contains two isocyanate groups and is not a reaction product, comprising at least two polyisocyanate molecules:

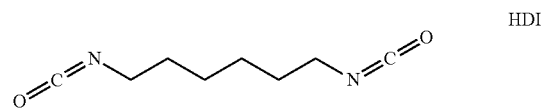 [SMILES: O=C=NCCCCCCN=C=O]

HDI

Reaction products comprising at least two HDI molecules and still containing at least two isocyanate groups, are by contrast "oligomeric polyisocyanate" within the meaning of the invention. Representatives of such "oligomeric polyisocyanates" are, starting from the monomeric HDI, e.g. HDI-isocyanurate and HDI-biuret, which are each constructed from three monomeric HDI components:

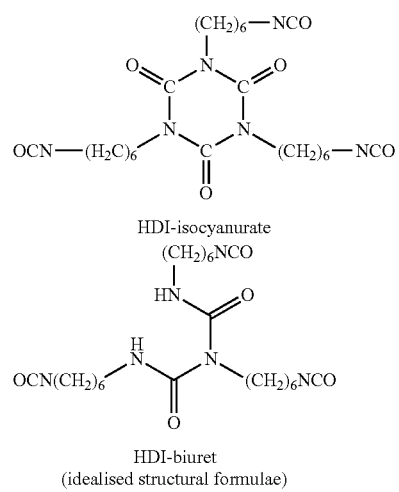

HDI-isocyanurate

HDI-biuret
(idealised structural formulae)

As mentioned above, the anode of the present invention comprises a polymer coating that is doped with lithium, preferably in the form of lithium ions and comprises a polyisocyanurate material. It has been found that, by forming such a polymer coating on the surface of the anode, it is possible to protect the anode from undesirable reactions. Specifically, the polymer coating may act as a protective layer or interface that reduces the risk of the anode reacting with, for example, the electrolyte solvent and/or polysulphide species dissolved in the electrolyte. This may reduce the risk of irreversible reactions that lead to consumption of the lithium metal, electrolyte solvent and/or electroactive sulphur material and/or enhance the safety of the electrochemical cell.

The polymer coating is advantageously ionically conductive. Accordingly, during cell discharge, lithium ions can flow through the coating into the electrolyte. Similarly, when the cell is charged, lithium ions from the electrolyte can flow through the coating and deposit beneath the coating as lithium metal. Thus, the coating described herein can perform a protective function whilst allowing the plating/deplating of lithium metal to take place. Certain embodiments of the polymer coating described herein, in particular the optional presence of trialkoxysilane and/or polyether groups in the polyisocyanurate plastics material, were found to further advantageously facilitate the conductive properties of the polymer coating.

The coating may be formed of any suitable polyisocyanurate material. In one embodiment, the polyisocyanurate material is formed as a result of catalytic trimerization of a coating composition containing oligomeric polyisocyanate comprising isocyanate groups. Preferably, the oligomeric polyisocyanate is an oligomer of a monomeric diisocyanate. According to one preferred embodiment of the invention the oligomeric polyisocyanate is obtained by oligomerization of monomeric diisocyanates, optionally with subsequent separation of monomers that have not reacted.

In another embodiment of the present invention, the coating composition used to form the polyisocyanurate plastic material comprises a higher proportion of monomeric polyisocyanates than described above or even essentially consists of monomeric polyisocyanates as defined further above in this application.

In the embodiment employing oligomeric polyisocyanates, the coating composition for coating the anode of the invention has a monomeric diisocyanates content of at most 20% by weight, in particular at most 15% by weight or at most 10% by weight, in each case based on the weight of composition. The coating composition preferably has a monomeric diisocyanates content of at most 5% by weight, preferably at most 2.0% by weight, particularly preferably at most 1.0% by weight, in each case based on the weight of composition. Most preferably, the coating composition is substantially free from monomeric diisocyanates. Substantially free means that the monomeric diisocyanates content is at most 0.5% or 0% by weight, based on the weight of composition.

In practice the low monomer content may be achieved by separating the excess monomeric diisocyanates that have not reacted after performing the oligomerization reaction. This removal of monomers can occur in a particularly practice-oriented manner according to processes that are known per se, preferably by thin-layer distillation in a high vacuum or by extraction with suitable solvents that are inert with respect to isocyanate groups, for example aliphatic or cycloaliphatic hydrocarbons such as pentane, hexane, heptane, cyclopentane or cyclohexane.

According to the invention the oligomeric polyisocyanate can in particular have a uretdione, isocyanurate, allophanate, biuret, iminooxadiazindione and/or oxadiazintrione structure. According to one embodiment of the invention the oligomeric polyisocyanate has at least one of the following oligomeric structural types or mixtures thereof:

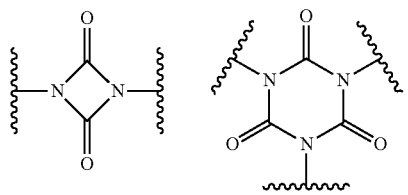

-continued

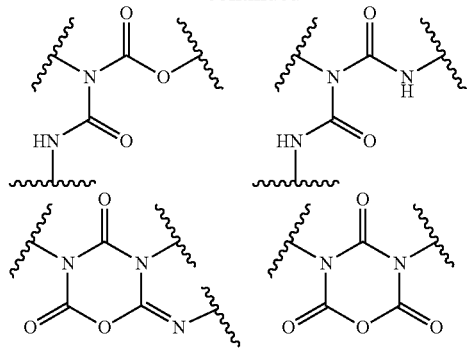

uretdione isocyanurate allophanate biuret iminooxadiazindione oxadiazintrione

The uretdione, isocyanurate, allophanate, biuret, iminooxadiazindione and/or oxadiazintrione structure in the oligomeric polyisocyanates can be determined e.g. by NMR spectroscopy. $^{13}$C-NMR spectroscopy, preferably proton-decoupled, can preferably be used here since said oligomeric structures supply characteristic signals.

The oligomeric polyisocyanates are conventionally obtained by oligomerisation of simple aliphatic, cycloaliphatic, araliphatic and/or aromatic monomeric diisocyanates or mixtures of such monomeric diisocyanates. According to a preferred embodiment of the invention, the oligomeric polyisocyanate contains an isocyanurate structure.

Suitable monomeric polyisocyanates for preparing the oligomeric polyisocyanates are any desired polyisocyanates that are accessible in various ways, for example by phosgenation in the liquid or gas phase or in a phosgene-free manner, such as, e.g. by thermal urethane cleaving. Particularly good results occur if the polyisocyanates are monomeric diisocyanates. Preferred monomeric diisocyanates are those which have a molecular weight in the range of 140 to 400 g/mol, with aliphatically, cycloaliphatically, araliphatically and/or aromatically bound iscyanate groups, such as, e.g. 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-lsocyanato-3,3,5-trimethyl-5-isocyanatomethyl-cyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis-(isocyanatomethyl)-norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetra-methyl-1,1'-bi(cyclohexyl), 1,8-diisocyanato-p-menthane, 1,3-diisocyanato-adamantane, 1,3-dimethyl-5,7-diisocyanatoadamantane, 1,3- and 1,4-bis-(iso¬icyanatomethyl)benzene (xyxlylene diisocyanate; XDI), 1,3- and 1,4-bis(1-isocyanato-1-methyl¬ethyl)-benzene (TMXDI) and bis(4-(1-isocyanato-1-methylethyl)phenyl)-carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are also suitable can be found, moreover, for example in Justus Liebigs Annalen der Chemie Band 562 (1949) p. 75-136.

"Trimerisation" as used herein refers primarily to the cyclotrimerisation reaction of three isocyanate groups to form a isocyuanurate structure. However, depending on the catalyst used, the formation of isocyuanurate structures is often accompanied by side reactions such as dimerisations to uretdione structures, trimerisation to Iminooxadiazindione structures (so-called asymmetric trimers) or allophanatisation reactions if urethane groups are present in the polyisocyanate polymer precursor. Accordingly, in one embodiment the term "trimerisation" as used herein, shall synonymously also include these additional reactions taking place.

According to a preferred embodiment, however, "trimerization" shall mean that cyclotrimerisation of at least 50%, 60%, 70% or 80% of the isocyanate groups present in the polymer precursor (e.g. oligomeric polyisocyanate precursor) or the coating composition to isocyanurate structures occurs. Side reactions, in particular such leading to uretdione-, allophanate-, and/or Iminooxadiazinedione-structure, however, usually occur. They can even be purposefully employed to, for example, advantageously influence the Tg-value or the ionic conductivity of the obtained polyisocyuanurate plastics material.

Therefore, in another preferred embodiment of the present invention, at least 50%, 60%, 70% or 80% of the isocyanate groups present in the polyisocyanate form structures selected from the group consisting of isocyanurate, uretdione-, allophanate-, and Iminooxadiazinedione structures. More preferably, at least 50%, 60%, 70% or 80% of the isocyanate groups present in the polyisocyanate form structures selected from the group consisting of isocyanurate, uretdione-, and Iminooxadiazinedione structures. In this embodiment it is preferred that the majority of the isocyanate groups forms isocyanurate groups.

According to a preferred embodiment of the invention the oligomeric polyisocyanate used in the anode coating composition has only aliphatically and/or cycloaliphatically bound isocyanate groups.

Aliphatically or cycloaliphatically bound isocyanate groups are taken to mean isocyanate groups that are bound to an aliphatic or cycloaliphatic hydrocarbon radical.

According to a further preferred embodiment of the invention a coating composition is used to coat the anode of the invention which contains one or more oligomeric polyisocyanates, where the one or more oligomeric polyisocyanates has/have only aliphatically and/or cycloaliphatically bound isocyanate groups.

According to yet a further preferred embodiment of the invention, a coating composition is used to coat the anode of the invention which contains one or more monomeric polyisocyanates, where the one or more monomeric polyisocyanates has/have only aliphatically and/or cycloaliphatically bound isocyanate groups According to a particularly preferred embodiment of the invention an anode coating composition is used which contains one or more oligomeric polyisocyanates, where the one or more oligomeric polyisocyanates are constructed on the basis of 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof. In some examples, the oligomeric polyisocyanate is an oligomer of hexamethylene diisocyanate and/or pentamethylene diisocyanate.

The oligomeric polyisocyanate may be a trimer (isocyanurate) of a monomeric diisocyanate. For example, the trimer may have the general formula:

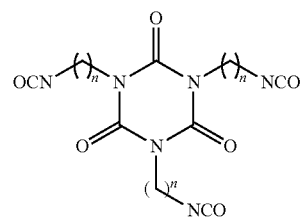

wherein n is 1 to 15, for example, 3 to 10, preferably 5 or 6.

In one embodiment, an oligomeric polyisocyanate is used that is modified with at least one functional group. This can be achieved, for example, by reacting or capping at least one of the isocyanate or NCO groups in the oligomeric polyisocyanate used in the coating composition for the coating of the anode of the invention with a functional group-containing compound that also contains a group being reactive with isocyanate groups. The corresponding reaction product is an oligomeric polyisocyanate modified with at least one functional group. Similarly, in a preferred embodiment of the invention, the isocyanurate material comprised in the polymer coating of the invention is modified with functional groups. Such a modified isocyanurate material can be obtained by trimerisation of the above-described oligomeric polyisocyanate that is modified with at least one functional group. In particular, hydroxyl groups, thiol groups, amino groups, amide groups and isocyanate groups can be used as "groups that are reactive with isocyanate groups". The functional group with which the oligomeric polyisocyanate and/or the isocyanurate material are modified with can be selected from a silicon-containing containing group, in particular a siloxane group, and a ether-containing group, in particular a polyether-containing group.

According to a preferred embodiment at least one of the isocyanate or NCO groups in the oligomeric polyisocyanate used in the coating composition for the coating of the anode of the invention is capped or reacted with a silicon-containing compound or an ether-containing compound. In other words, the oligomeric polyisocyanate preferably is an oligomeric, silicon-containing polyisocyanate or an oligomeric, ether-containing polyisocyanate and the isocyanurate material of the invention is preferably modified with silicon- or ether-containing groups. The phrases "oligomeric polyisocyanate capped with a silicon-containing compound", "oligomeric silicon-modified polyisocyanate" and "oligomeric, silicon-containing polyisocyanate" have the same meaning and are used interchangeably herein. Likewise the phrase "oligomeric polyisocyanate capped with an ether-containing compound" and "oligomeric, ether-containing polyisocyanate" have the same meaning and are used interchangeably herein. As the expression "oligomeric, modified polyisocyanate" illustrates, the oligomeric, modified polyisocyanates still comprise (on average) a plurality (at least two) isocyanate groups, i.e. the reaction of the isocyanate groups of the oligomeric polyisocyanate with the isocyanate reactive group of the functional group-containing compound is incomplete.

According to a particularly preferred embodiment at least one of the isocyanate or NCO groups in the oligomeric polyisocyanate used in the coating composition for the coating of the anode of the invention is capped or reacted with a silicon-containing compound.

Preparation processes for the oligomeric, silicon-modified polyisocyanates, having a uretdione, isocyanurate, allophanate, biuret, iminooxadiazindione and/or oxadiazintrione structure, that may be used in the low-monomer coating composition according to the invention are described, for example, in EP-A 1 273 640, WO-A 2008/074490, WO-A 2008/074489, WO-A 2014/086530, WO-A 2010/149236, WO-A 2009/156148, EP-A 2 104 692.

Usually, oligomeric, silicon-modified polyisocyanates are obtained by oligomerisation of simple aliphatic, cycloaliphatic, araliphatic and/or aromatic, monomeric, silicon-modified diisocyanates or by partial reaction of oligomeric polyisocyanates with silicon-containing compounds. The terms "partial reaction with silicon-containing compounds" or "silicon-modified" are used interchangeably within the meaning of the invention and mean in particular that 5 to 80, preferably 10 to 50 and especially 15 to 40 mol-% of the isocyanate groups originally present in the oligomeric polyisocyanate or diisocyanate have been reacted with silicon-containing compounds. In other words, the oligomeric, silicon-modified polyisocyanates prepared by partial reaction of oligomeric polyisocyanates with silicon-containing compounds have an isocyanate content of preferably at least 20, more preferably at least 50 and most preferably at least 60 mol-%, based on the originally present isocyanate groups of the oligomeric polyisocyanates. As the expression "oligomeric, silicon-modified polyisocyanate" illustrates, the oligomeric, modified polyisocyanates still comprise (in average) a plurality (at least two) isocyanate groups, i.e. the reaction of the isocyanate groups of the oligomeric polyisocyanate with the functional isocyanate reactive group of the silicon-containing compound is incomplete.

Organic and inorganic silicon-containing compounds can be used as silicon-containing compounds. "Inorganic silicon-containing compounds" are taken to mean silicon-containing compounds that do not have any silicon-carbon bond. According to the invention, suitable inorganic silicon-containing compounds are, for example, $SiO_2$-nanoparticles or silicates.

It has found to be particularly useful to use silicon-containing compounds chosen from the group comprising oligomeric silicon-modified polyisocyanates, amino silanes, silane-functional aspartic acid esters, silane-functional alkyl amides, mercaptosilanes, isocyanato-silanes, thiourethanes prepolymers, urethane prepolymers and mixtures thereof. These each contain besides their silane-functional group at least one group that is reactive with isocyanate groups.

Suitable amino silanes are, for example, 3-aminopropyltrimethoxysilane, 3-amino-propyltriethoxysilane, 3-aminopropylmethyldimethoxysilane, 3-aminopropylmethyldiethoxysilane, 3-aminopropylethyldiethoxysilane, 3-aminopropyldimethylethoxysilane, 3-amino-propyldiisopropylethoxysilane, 3-aminopropyltripropoxysilane, 3-aminopropyltributoxy-silane, 5 3-aminopropylphenyldiethoxysilane, 3-aminopropylphenyldimethoxysilane, 3-aminopropyl-tris(methoxyethoxyethoxy)silane, 2-aminoisopropyltrimethoxysilane, 4-aminobutyltrimethoxy-silane, 4-aminobutyltriethoxysilane, 4-aminobutylmethyldimethoxy-silane, 4-aminobutyl-methyldiethoxysilane, 4-aminobutylethyldimethoxysilane, 4-amino-butylethyldiethoxysilane, 4-aminobutyl-dimethylmethoxysilane, 4-aminobutylphenyl-dimethoxysilane, 4-aminobutyl-phenyldiethoxysilane, 4-amino(3-methylbutyl)methyldimethoxysilane, 4-amino(3-methylbutyl)-methyldiethoxysilane, 4-amino(3-methylbutyl)-trimethoxysilane, 3-aminopropylphenylmethyl-n-propoxysilane, 3-amino-propylmethyl-dibutoxysilane, 3-aminopropyldiethylmethylsilane, 3-aminopropylmethyl-bis(tri-methylsiloxy)silane, 11-aminoundecyltrimethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-(2-aminoethyl)-3-aminopropyltrimethoxysilane, N-(2-aminoethyl)-3-aminoisobutylmethyldimethoxysilane, N-(2-aminoethyl)-3-aminopropylmethyldimethoxysilane, N-(2-aminoethyl)-3-aminopropyltris(2-ethylhexoxy)-silane, N-(6-amino-hexyl)-3-aminopropyltrimethoxysilane, N-benzyl-N-(2-aminoethyl)-3-aminopropyltrimethoxysilane, bis(3-trimethoxysilylpropyl)amine, bis(3-triethoxysilylpropyl)-amine, (aminoethylaminomethyl)-phenethyltrimethoxysilane, N-vinylbenzyl-N-(2-aminoethyl)-3-aminopropylpolysiloxane, N-vinyl-benzyl-N (2-aminoethyl)-3-aminopro-pylpolysiloxane, 3-ureidopropyltriethoxysilane, 3-(m-aminophenoxy)-propyltrimethoxy-silane, m- and/or p-aminophenyltrimetoxysilane, 3-(3-amino-propoxy)-3,3-dimethyl-1-propenyltrimethoxysilane, 3-aminopropylmethylbis(trimethylsiloxy)-silane, 3-aminopropyl-tris(trimethyl-siloxy)-silane, 3-aminopropylpentamethyldisiloxane or any desired mixtures of such amino silanes.

Most particularly preferred amino silanes are N-methyl-3-aminopropyltrimethoxysilane, N-methyl-3-aminopropyl-triethoxysilane, N-(n-butyl)-3-aminopropyltrimethoxysilane, N-(n-butyl)-3-aminopropyltriethoxysilane, bis(3-trimethoxysilylpropyl)-amine and/or bis(3-triethoxysilylpropyl)amine.

Suitable silane-functional aspartic acid esters may be obtained according to the teaching of EP-A 0 596 360 by reacting amino silanes carrying primary amino groups with fumaric acid esters and/or maleic acid esters.

Particularly preferred silane-functional aspartic acid esters are reaction products of 3-aminopropyl-trimethoxysilane and/or 3-aminopropyltriethoxysilane with maleic acid diethyl ester.

Silane-functional alkyl amides suitable according to the invention may be obtained, for example, according to the process disclosed in U.S. Pat. Nos. 4,788,310 and 4,826,915 by reacting amino silanes carrying primary amino groups with alkyl carboxylates with separation of alcohol.

Particularly preferred silane-functional alkyl amides are reaction products of 3-aminopropyl-trimethoxysilane and/or 3-aminopropyltriethoxysilane with methyl formate and/or ethyl formate.

Suitable Mercaptosilanes are, for example, 2-mercaptoethyltrimethylsilane, 2-mercaptoethylmethyldimethoxysilane, 2-mercaptoethyltrimethoxy-silane, 2-mercapto-ethyltriethoxysilane, 3-mercaptopropylmethyldimethoxysilane, 3-mercaptopropyldimethyl-methoxysilane, 3-mercaptopropyltrimethoxysilane, 3-mercapto-propylmethyldiethoxysilane, 3-mercaptopropyltriethoxysilane, 3-mercaptopropylethyldimethoxysilane, 3-mercaptopropylethyldiethoxysilane and/or 4-mercaptobutyltrimethoxysilane.

Most particularly preferred mercaptosilanes are in particular 3-mercaptopropyltrimethoxy-silane and/or 3-mercaptopropyltriethoxysilane.

In another embodiment, Isocyanato silanes monomers like for example, 3-isocyanatopropyltrimethoxysilane or 3-isocyanatopropyltriethoxysilane are used.

In one embodiment, the oligomeric polyisocyante used in the anode coating composition may be an oligomer of a monomeric diisocyanate, wherein at least one of the >N=C=O groups is reacted or end-capped with a trialkoxysilane moiety.

In another embodiment, the oligomeric, silicon-modified polyisocyanate as described in WO 2014/037279 may be used. It may have the following idealised structure:

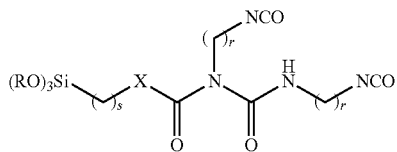

wherein r is 1 to 15, for example, 3 to 10, preferably 5 or 6, s is 1 to 15, for example, 3 to 10, preferably 6, and R is an alkyl group, for example, a $C_1$ to $C_6$ alkyl group (e.g. methyl or ethyl).

According to an alternative particularly preferred embodiment at least one of the isocyanate or NCO groups of the oligomeric polyisocyanate used in the anode coating composition is capped or reacted with an ether-containing compound, i.e. is an ether-modified oligomeric polyisocyanate. Preferably, the ether is a polyether.

Such oligomeric, ether-modified polyisocyanates as well as their preparation starting from oligomeric polyisocyanates and ether-containing compounds, having at least one group being reactive with isocyanate groups, are well known to the skilled person from the state of the art and are e.g. described in EP-A 0540985 and EP-A 0959087. Preferred oligomeric, ether-modified polyisocyanates that are used for the preparation of the coating of the anode of the invention are e.g. commercially available under the trademark Bayhydur® of Covestro AG, Germany. In one embodiment, the ether-modified polyisocyanate is a polyisocyanate sold under the trademark Bayhydur®, for example, Bayhydur® 3100.

The oligomeric, ether-modified polyisocyanates may be obtained by a partial reaction of oligomeric polyisocyanates with ether-containing compounds. The terms "partial reaction with ether-containing compounds" or "ether-modified" are used interchangeably within the meaning of the invention and mean in particular that 3-50, preferably 5-15 mol-% of the isocyanate groups originally present in the oligomeric polyisocyanate have been reacted with ether-containing compounds. In other words, the oligomeric, ether-modified polyisocyanates prepared by partial reaction of oligomeric polyisocyanates with ether-containing compounds have an isocyanate content of 50-97, preferably 85-95 mol-%, based on the originally present isocyanate groups of the oligomeric polyisocyanates. As the expression "oligomeric, ether-modified polyisocyanate" illustrates, the oligomeric, ether-modified polyisocyanates still comprise (on average) a plurality (at least two) isocyanate groups, i.e. the reaction of the isocyanate groups of the oligomeric polyisocyanate with the functional isocyanate reactive group of the ether-containing compound is incomplete.

Suitable ether-containing compounds are polyether alcohols, particularly polyalkyleneoxide polyether alcohols, preferably monovalent or multivalent polyalkyleneoxide polyether alcohols having a statistical average of 5 to 50 ethylene oxide units per molecule, such as the ones known per se to be accessible by alkoxylation of suitable starter molecules (see e.g. Ullmanns Encyclopädie der technischen Chemie, 4. Auflage, Band 19, Verlag Chemie, Weinheim S. 31-38). Such starter molecules may be selected among any monovalent or multivalent alcohols having a molecular weight in the range of 32 to 300, as e.g. methanol, ethanol, n-propanol, isopropanol, n-butanol, isobutanol, sec-butanol, the isomeric pentanoles, hexanoles, octanoles und nonanoles, n-decanol, n-dodecanol, n tetradecanol, n-hexadecanol, n-octadecanol, cyclohexanol, the isomeric methylcyclohexanoles, hydroxy-methylcyclohexanes, 3-methyl-3-hydroxymethyloxetane, benzylalcohol, phenol, the isomeric cresoles, octylphenoles, nonylphenoles und naphtholes, furfurylalcohol, tetrahydrofurfurylalcohol, 1,2-ethandiol, 1,2- und 1,3-propandiol, the isomeric butandioles, pentandioles, hexandioles, heptandioles und octandioles, 1,2- and 1,4-cyclohexandiol, 1,4-cyclohexandimethanol, 4,4'-(1-methylethyliden)-biscyclohexanol, 1,2,3-propantriol, 1,1,1-trimethylolethane, 1,2,6-hexantriol, 1,1,1-trimethylolpropane, 2,2-bis(hydroxmethyl)-1,3-propandiol or 1,3,5-tris(2-hydroxyethyl)-isocyanurate.

Suitable alkyleneoxides for the alkoxylation reaction are particularly ethylene oxide and propylene oxide, which may be used in the alkoxylation reaction in any particular order or in a mixture. Suitable polyetheralcohols are either pure polyethylene oxide polyether alcohols or mixed polyalkylene oxide polyether, whose alkylene oxide units consist at least of 70 mol-%, preferably at least 80 mol-%, of ethylene oxide.

Preferably the ether-containing compound is a polyether alcohol, particularly a polyalkylene oxide polyether alcohol, notably such, that has be prepared from the aforementioned monovalent alcohols having a molecular weight from 32 to 150 as starter molecules.

In a particular embodiment, the ether-containing compound is a pure polyethylene glycol monomethyl ether alcohol, particularly such, that it contains a statistical average of 5 to 50, preferably 5 to 25 ethylene oxide units.

In another embodiment, the oligomeric, ether-modified polyisocyanate is a trimer having the generalised structure:

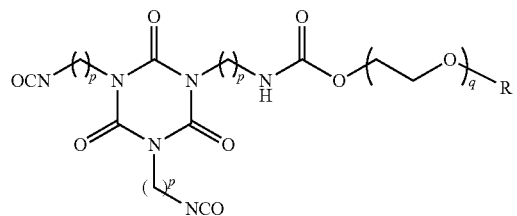

wherein p is 1 to 15, for example, 3 to 10, preferably 5 or 6 q is 2 to 10, for example, 5 to 7, preferably 6, and

R is an alkyl group, for example, a $C_1$ to $C_6$ alkyl group (e.g. methyl or ethyl).

In the present invention, the coating is formed by trimerisation of the oligomeric polyisocyanate to form a polyisocyanurate material. In a preferred embodiment, the trimerisation is a catalytic trimerisation, i.e. occurs in the presence of a catalyst. This can be achieved by including a catalyst in the coating composition. Advantageously, the trimerisation reaction is carried out by contacting (e.g. by dipping or spreading) the anode with the coating composition in form of a solution or dispersion of the oligomeric polyisocyanate and a lithium salt and then trimerising the oligomeric polyisocyanate. By ensuring that the trimerisation reaction takes place in the presence of the anode and lithium ions, the resulting polyisocyanurate material is doped with lithium ions and deposited on the lithium anode in situ. The coated anode may then be used in a lithium sulphur cell as described in further detail below. Only a portion of the anode's surface may be coated. The anode may be coated on one or both sides.

The weight ratio of lithium ions to oligomeric polyisocyanate in the dispersion or solution is preferably 1 wt.-%; to 50 wt.-%, more preferably 5 wt.-% to wt.-20% Accordingly, the lithium ion concentration in the doped polymer is preferably 1 wt.-% to 50 wt.-%, more preferably, 5 wt.-% to 20 wt.-%.

The lithium ion may be provided in the form of a lithium salt that is dissolved or dispersed in the dispersion containing the oligomeric polyisocyanate. The lithium salt may be the same or different from the lithium salt employed in the electrolyte of the cell. Preferably, the lithium salt is the same as the lithium salt employed in the electrolyte of the cell. Examples of suitable lithium salts include lithium hexafluorophosphate, lithium hexafluoroarsenate, lithium perchlorate, lithium trifluoromethanesulfonimide, lithium bis(oxalate) borate and lithium trifluoromethanesulphonate. Preferably the lithium salt is lithium trifluoromethanesulphonate (also known as lithium triflate). Combinations of salts may be employed. The salt may be present at a concentration of 0.1 to 5 M, preferably, 0.5 to 3 M, for example, 1 M.

The polyisocyanurate material for coating the anode according to the invention can be obtained by catalytic trimerisation. "Catalytic" means in the presence of a suitable trimerisation catalyst. Suitable catalysts are being described e.g. in Houben-Weyl "Methoden der Organischen Chemie", Band E 20, p. 1741-1744, Georg Thieme Verlag; 1987. In one preferred embodiment, the catalyst comprises a salt of a (cyclo)aliphatic carboxylic acid. Preferably, an alkali metal acetate, for example, sodium or potassium acetate is employed. Optionally, a oligoethylenglykol solvent like diethylenglykol or a crown ether may also be employed to coordinate the alkali metal ion, thereby liberating the acetate anion to catalyse the reaction. The size of the crown ether may be tailored to the specific alkali metal ion requiring co-ordination. For example, a suitable crown ether is 18-crown-6 for the potassium cation.

The amount of catalyst is depending on the reactivity of the oligomeric polyisocyanate used and the reaction conditions. They can be determined in simple experiments. Preferably, 0.3 to 5.0% by weight of catalyst is used. More preferably, 0.5 to 2.0% by weight is used.

The reaction may be carried out in the presence of a glycol or glycol ether solvent, for example, diethylene glycol or polyethylene glycol. The reaction may be carried out at an elevated temperature. Suitable temperatures range from 60 to 180° C. preferably 120 to 140° C. Preferably, the polymerisation reaction is carried out at a temperature below the melting point of lithium.

The polymer formed on the lithium anode is a lithium ion-doped polyisocyanurate material. The polyisocyanurate material may include trialkyoxysilane groups. In an alternative embodiment, the polyisocyanurate material may include ether groups, for example, polyether groups. Examples of polyether groups include polyalkyleneoxide-monoalkylether groups e.g. polyethyleneoxide monoethylether groups.

In one embodiment, the polymer may include a filler, for example, an inorganic filler. Such inorganic fillers may be incorporated in the polymer, for example, by dispersing the filler in the dispersion or solution containing the oligomer. During trimerisation, the filler may be incorporated into the structure of the polymer coating. Examples of suitable fillers include silica, alumina, titania, zirconia, tantalum oxide, clays (e.g. montmorillonite) and so on, more specifically, silica nanoparticles. The filler may be present in an amount of 0.1 to 80 weight %, preferably 15 to 50 weight %, more preferably 20 to 30 weight % of the total weight of the polymer coating.

The polymer coating may have a $T_g$ of −0° C. to 130° C., preferably, 20 to 100° C.

Any suitable lithium anode may be coated with the polymer coating described herein. The anode comprises a lithium metal or lithium metal alloy. Preferably, the anode comprises a foil formed of lithium metal or lithium metal alloy. Examples of lithium alloy include lithium aluminium alloy, lithium magnesium alloy and lithium boron alloy. Preferably, a lithium metal foil is used.

The anode may be used to assemble the lithium sulphur cell. For example, the anode and a cathode comprising a mixture of electroactive sulphur material and solid electroconductive material may be placed in contact with an electrolyte.

The cathode of the electrochemical cell includes a mixture of electroactive sulphur material and electroconductive material. This mixture forms an electroactive layer, which may be placed in contact with a current collector, formed for example of metal foil (e.g. Al foil).

The electroactive sulphur material may comprise elemental sulphur, sulphur-based organic compounds, sulphur-based inorganic compounds and sulphur-containing polymers. Preferably, elemental sulphur is used.

The solid electroconductive material may be any suitable conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Preferably, carbon black is employed.

The mixture of electroactive sulphur material and electroconductive material may be applied to the current collector in the form of a slurry in a solvent (e.g. water or an organic solvent). The solvent may then be removed and the resulting structure calendared to form a composite structure, which may be cut into the desired shape to form a cathode. A separator may be placed on the cathode and a lithium anode placed on the separator. Electrolyte may then be introduced into the assembled cell to wet the cathode and separator. Alternatively, the electrolyte may be applied to the separator, for example, by coating or spraying before the lithium anode is placed on the separator.

The electroactive sulphur material (e.g. elemental sulphur) may be present in an amount of 60 to 90 weight %, preferably 65 to 85 weight %, more preferably 60 to 80 weight % of the total weight of the cathode. The electroconductive material (e.g. carbon) may be present in an amount of 1 to 30 weight %, preferably 3 to 20 weight %, more preferably 5 to 10 weight % of the total weight of the cathode. The amount of binder, where present, may be from 0 to 30 weight %, preferably 3 to 30 weight %, more preferably 5 to 20 weight % of the weight of the cathode. The weight ratio of electroactive sulphur material (e.g. elemental sulphur) to electroconductive material (e.g. carbon) may be 90:1 to 3:1, preferably 6:1 to 14:1.

Where a separator is present in the cell of the present invention, the separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Suitable separators include a mesh formed of a polymeric material.

Suitable polymers include polypropylene, nylon and polyethylene. Non-woven polypropylene is particularly preferred. It is possible for a multi-layered separator to be employed.

The electrolyte may comprise an organic solvent. Suitable organic solvents for use in the electrolyte are sulfones (e.g. sulfolane), tetrahydrofurane, 2-methyltetrahydrofurane, dimethylcarbonate, diethylcarbonate, ethylmethylcarbonate, methylpropylcarbonate, methylpropylpropionate, ethylpropylpropionate, methyl acetate, dimethoxyethane, 1, 3-dioxolane, diglyme (2-methoxyethyl ether), tetraglyme, ethylene carbonate, propylene carbonate, butyrolactone, dioxolane, hexamethyl phosphoamide, pyridine, dimethyl sulfoxide, tributyl phosphate, trimethyl phosphate, and N, N, N, N-tetraethyl sulfamide. Mixtures of solvents may be employed.

In one example, the organic solvent comprises an ether. In one example, the organic solvent comprises tetraethylene glycol dimethyl ether (TEGDME). In another example, the organic solvent comprises TEGDME, dimethoxyethane and, optionally, 1, 3-dioxolane. In one example, TEGDME may form at least 40 v/v %, preferably at least 50% v/v of the organic solvent of the electrolyte. In one example, dimethoxyethane may form at least 20 v/v %, preferably at least 30% v/v of the organic solvent of the electrolyte. In one example, the organic solvent contains TEGDME, dimethoxyethane and 1, 3-dioxolane in a v/v ratio of 50:30:20.

The organic solvent of the electrolyte may have a viscosity of less than 20 cP, preferably less than 10 cP, more preferably less than 7 cP at 25 degrees C. Where mixtures of organic solvents are employed in the electrolyte, the mixtures may have a viscosity of less than 20 cP, preferably less than 10 cP, more preferably less than 7 cP at 25 degrees C. In one embodiment, the electrolyte may have a viscosity of less than 20 cP, preferably less than 10 cP, more preferably less than 7 cP at 25 degrees C.

The electrolyte comprises a lithium salt dissolved in the organic solvent. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Preferably the lithium salt is lithium trifluoromethanesulphonate (also known as lithium triflate). Combinations of salts may be employed. For example, lithium triflate may be used in combination with lithium nitrate. The lithium salt may be present in the electrolyte at a concentration of 0.1 to 5M, preferably, 0.5 to 3M, for example, 1M.

The electrolyte may also comprise lithium polysulphides. For example, lithium polysulphides may be added to the electrolyte before the cell is discharged. The concentration of lithium polysulphide dissolved in the electrolyte may be between 0.1% and 20% weight % (preferred concentration 1.5%). Examples of suitable lithium polysulphides include $Li_2S_n$ where n=at least 5, for example, 6 to 15, for example, 8-12 (e.g. 8) Lithium polysulphides may help to buffer the electrolyte, increase capacity of the cell or act as a source of sulphur to compensate for any loss of sulphur through the formation of non-conducting species.

The following examples are only intended to illustrate the invention. They shall not limit the scope of the claims in any way.

EXAMPLES

Methods:
All percentages are by weight unless otherwise indicated.

The NCO contents were determined titrimetrically according to DIN EN ISO 11909.

The residual monomer contents were measured by gas chromatography with internal standard according to DIN EN ISO 10283.

All viscosity measurements were effected with a Physica MCR 51 rheometer from Anton Paar Germany GmbH (DE) according to DIN EN ISO 3219 with a shear rate of D=100 $s^{-1}$.

Starting Materials:
Desmodur® N 3600 [Covestro AG, Germany, polyisocyanurate polyisocyanate based on 1,6-diisocyanatohexane (HDI), NCO content: 23.0%; viscosity (23° C.): 1200 mPas, monomeric HDI: 0.25%]

Bayhydur® 3100 [Covestro AG, Germany, polyetherhydrophilized polyisocyanurate polyisocyanate based on 1,6-diisocyanatohexane (HDI), NCO content: 17.4%; viscosity (23° C.): 2800 mPas, monomeric HDI: 0.15%]

Preparation of an Alkoxysilane Modified Polyisocyanate A 756 g (4.5 mol) of 1,6-diisocyanatohexane (HDI) were introduced under dry nitrogen with stirring at a temperature of 80° C. and 0.1 g of zinc(II) 2-ethyl-1-hexanoate as catalyst were added. Over a period of about 30 minutes, 294 g (1.5 mol) of mercaptopropyltrimethoxysilane were added dropwise, with the temperature of the mixture rising to up to 85° C. owing to the exothermic reaction. The reaction mixture was stirred further at 85° C. until, after about 2 hours, the NCO content had dropped to 24.0%. The catalyst was deactivated by addition of 0.1 g of orthophosphoric acid and the unreacted monomeric HDI was removed in a thin-film evaporator at a temperature of 130° C. and a pressure of 0.1 mbar. This gave 693 g of a virtually colourless, clear polyisocyanate mixture whose characteristics and composition were as follows:

NCO content: 11.8%
Monomeric HDI: 0.06%
Viscosity (23° C.): 452 mPas
Thiourethane: 0.0 mol %
Thioallophanate: 99.0 mol %
Isocyanurate groups: 1.0 mol %

Preparation of a Polyether Modified Polyisocyanate B 600 g (3.1 eq) of a polyisocyanate based on HDI, containing isocyanurate groups, having an NCO content of 21.7%, an average NCO-functionality of 3.5 (by GPC), a monomeric HDI content of 0.1% and a viscosity of 3000 mPas (23° C.), were introduced as an initial charge at 100° C. under dry nitrogen and with stirring, and 400 g (0.8 mol) of a monofunctional polyethylene oxide polyether prepared starting from methanol and having a number-average molecular weight of 500 g/mol were added over the course of 30 minutes, and the mixture was stirred further at this temperature until the NCO content of the mixture had dropped after about 2 hours to the figure of 9.6% corresponding to complete urethanization. After cooling to room temperature, the resultant colourless, clear, polyether-modified polyisocyanate mixture had the following characteristic data:

NCO content: 9.6%
Monomeric HDI: 0.04%
Viscosity (23° C.): 2400 mPas
NCO functionality: 2.6 (calculated)

Preparation of a Catalyst Solution K1

1.77 g of potassium acetate (Sigma Aldrich) were stirred for several hours together with 4.75 g of crown ether 18-Crown-6 (Merck KgaA) and 31.15 g diethylene glycol (Sigma Aldrich) at room temperature under dry nitrogen until a clear solution was obtained.

Example 1—Applying Coating Li Anode 100 g of the alkoxysilane modified polyisocyanate A (above) was weighed and placed into a large beaker. A pre-dispersed nano silica solution of 40 wt % $SiO_2$ (20 nm) in methyl ethyl ketone (Nissan chemical) was added to the polymer to achieve silica loadings of 50 weight %, 100 weight % and 150 weight % of the weight of the polymer. 27 g of LiTFSI salt was added to the solution corresponding to 27% of the weight of the polymer. The solutions were stirred until complete polymer dissolution. Then anhydrous tetrahydrofuran was added to each of the 3 solutions to 500 mL of each solution. 3 polymer solutions were thus produced, each with its respective silica loading.

A catalyst mixture was prepared by stirring 0.59 g of potassium acetate and 1.5833 g of 18-Crown-6 in 10.38 g of anhydrous diethylene glycol. 3.14 g of this catalyst mixture was added to each of the 3 polymer solutions.

Lithium foil electrodes were dipped into each of the polymer solutions. The coated foil electrodes were then removed and the coating was allowed to dry at room temperature for 5 minutes. The coated lithium foil electrodes were further cured at 130° C. for 30 minutes to ensure complete polymerisation.

The coated lithium foil electrodes were used as anodes in lithium-sulphur cells. The cells were then cycled in an ether based electrolyte: 1M LiOTf, 0.5M LiNO3 in DME:DEGDME:DIOX (⅓:⅓:⅓). As a reference, an identical cell assembled using an uncoated lithium foil electrode was also cycled in an identical manner.

The results shown in FIG. 1 show that each of the coatings improves the cycling performance over corresponding cells assembled using bare (uncoated) lithium foil anodes.

Cells were disassembled after 80 cycles and SEM pictures were taken of the lithium foil electrodes. The surface of the uncoated lithium foil electrode was uneven and showed signs of extensive mossy lithium growth. In contrast, the surfaces of the coated lithium foil electrodes were relatively smooth.

It was observed that, when no protective coating was used, lithium growth was mossy leading to a high rate of electrolyte depletion. When polymer coatings were applied to the lithium, the growth of mossy lithium was hindered, slowing the rate of electrolyte depletion and thus improving the cycle life at low electrolyte loading (for high energy density battery).

Example 2—Stripping-Plating Tests

A lithium-lithium stripping-plating test was performed using 100 μm thick uncoated lithium metal electrodes as a control. This test was performed by mounting two discs of the lithium electrodes in a coin cell. A polyolefin separator was used to prevent contact between the two lithium discs. Then electrolyte (1M LiOTf in TEGDME) was introduced between the discs and current corresponding to 1 $mA/cm^2$ was applied for one hour to allow transfer of lithium ion from one lithium disc to the other. After an hour the current was reversed in order to de-plate the plated lithium disc and re-plate the second lithium disc. The striping/plating voltage was measured against time.

The stripping-plating test was repeated using coated lithium electrodes. Here the 100 μm thick lithium electrodes were coated with a coating similar to that described in Example 1 above. Instead of silica, however, 5% Montmorillonite clay was incorporated into the polymer as filler.

The uncoated lithium control failed after 160 hours whereas the coated lithium was stable for over 200 hours indicating the effectiveness of the protective coating in preventing lithium dendritic growth.

The invention claimed is:

1. An anode for an electrochemical cell, the anode comprising:
   a lithium metal or lithium metal alloy, and
   a polymer coating deposited on the lithium metal or lithium metal alloy,
   wherein the polymer coating is doped with lithium ions and comprises a polyisocyanurate material,
   wherein the polyisocyanurate material contains ether- and/or silicone-containing further groups, and
   wherein the ether-containing group is a polyether and/or wherein the silicone-containing group is a siloxane group.

2. The anode as claimed in claim 1, wherein the polymer coating further includes an inorganic filler.

3. The anode as claimed in claim 2, wherein the filler comprises silica or clay nanoparticles.

4. The anode as claimed in claim 1, wherein the polymer coating comprises at least 5 weight % lithium ions.

5. A lithium-sulphur cell comprising:
   an anode as claimed in claim 1,
   a cathode comprising an electroconductive material and an electroactive material comprising sulphur, and
   an electrolyte.

6. The anode as claimed in claim 1, wherein the polyether is a polyalkyleneoxide-monoalkylether.

7. The anode as claimed in claim 1, wherein the siloxane group is a trialkoxysilane group.

8. A method of forming a coating on the anode of the electrochemical cell of claim 1, said method comprising the steps of:
   a) contacting an anode formed of lithium metal or lithium metal alloy with a coating composition, wherein the coating composition is in form of a dispersion or a solution and contains a polymer precursor comprising isocyanate groups, a lithium metal salt and a solvent, and
   b) trimerising the polymer precursor as a coating on the anode, wherein at least 50 mol % of the isocyanate groups of the polymer precursor form structures selected from the group consisting of isocyanurate, uretdione-, allophanate-, and iminooxadiazinedione structures.

9. The method as claimed in claim 8, wherein the polymer precursor comprises oligomeric polyisocyanate, and wherein the oligomeric polyisocyanate is trimerised as the coating on the anode, wherein at least 50 mol % of the isocyanate groups comprised by the oligomeric polyisocyanate form structures selected from the group consisting of isocyanurate, uretdione-, allophanate-, and iminooxadiazinedione structures.

10. The method as claimed in claim 8, wherein the dispersion or solution further includes inorganic filler(s).

11. The method as claimed in claim 9, wherein the oligomeric polyisocyanate is an oligomer of a monomeric diisocyanate.

12. The method as claimed in claim 11, wherein the oligomeric polyisocyanate is an oligomer of hexamethylene diisocyanate.

13. The method as claimed in claim 12, wherein the oligomeric polyisocyanate comprises monomer units formed from a trimer of hexamethylene diisocyanate.

14. The method as claimed in claim 9, wherein at least some of the NCO groups in the oligomeric polyisocyanate are capped with ether- and/or silicon-containing groups.

15. The method as claimed in claim 14, wherein the ether-containing group is a polyether, in particular a polyalkyleneoxide-monoalkylether, and/or wherein the silicone-containing group is a siloxane group, in particular a trialkoxysilane group.

16. The method as claimed in claim 8, wherein the coating composition comprises a trimerisation catalyst, in particular an alkali metal acetate and a crown ether.

17. The method as claimed in claim 16, wherein the trimerisation step is carried out at a temperature of 60-150° C.

\* \* \* \* \*